United States Patent [19]

Horikawa et al.

[11] Patent Number: 5,062,095
[45] Date of Patent: Oct. 29, 1991

[54] ACTUATOR AND METHOD OF MANUFACTURING THEREOF

[75] Inventors: Mitsuhiro Horikawa; Hiroshi Ito; Tsugio Ide; Michio Yanagisawa; Tatsuya Shimoda; Koji Akioka, all of Suwa, Japan

[73] Assignee: Seiko Epson Corporation, Tokyo, Japan

[21] Appl. No.: 303,602

[22] Filed: Jan. 27, 1989

[30] Foreign Application Priority Data

Jul. 21, 1988 [JP] Japan .................................. 63-182418
Aug. 26, 1988 [JP] Japan .................................. 63-211637

[51] Int. Cl.$^5$ .......................... G02B 7/04; G11B 11/04
[52] U.S. Cl. ........................ 369/44.21; 369/44.22; 369/44.14; 359/822; 359/823
[58] Field of Search ............... 369/44.14, 44.17, 44.18, 369/44.19, 44.41, 44.21, 44.22, 44.11; 350/255, 247, 6.3; 250/250.01; 148/101, 301; 252/24, 62.05

[56] References Cited

U.S. PATENT DOCUMENTS

| | | | |
|---|---|---|---|
| 4,100,576 | 7/1978 | Ditthardt | 369/44.17 |
| 4,561,081 | 12/1985 | Janssen et al. | 369/44.17 |
| 4,734,899 | 3/1988 | Van Sluys | 369/44.41 |

Primary Examiner—Roy N. Envall, Jr.
Assistant Examiner—Hindi Nabil
Attorney, Agent, or Firm—Blum Kaplan

[57] ABSTRACT

An actuator rotatable about a support shaft rectilinearly movable along axis of a shaft and rotatably movable about the shaft includes a cylindrical magnet extending about the shaft. The cylindrical magnet has a plurality of poles in the radial direction and magnetized boundaries between poles of opposite polarity extending in a circumferential direction of the magnet and extending in an axial direction of the magnet. A plurality of yokes are provided to define magnetic poles coupled in facing relationship with the magnetic boundaries of a cylindrical magnet and having coils coupled thereto to define the magnetic poles.

24 Claims, 16 Drawing Sheets

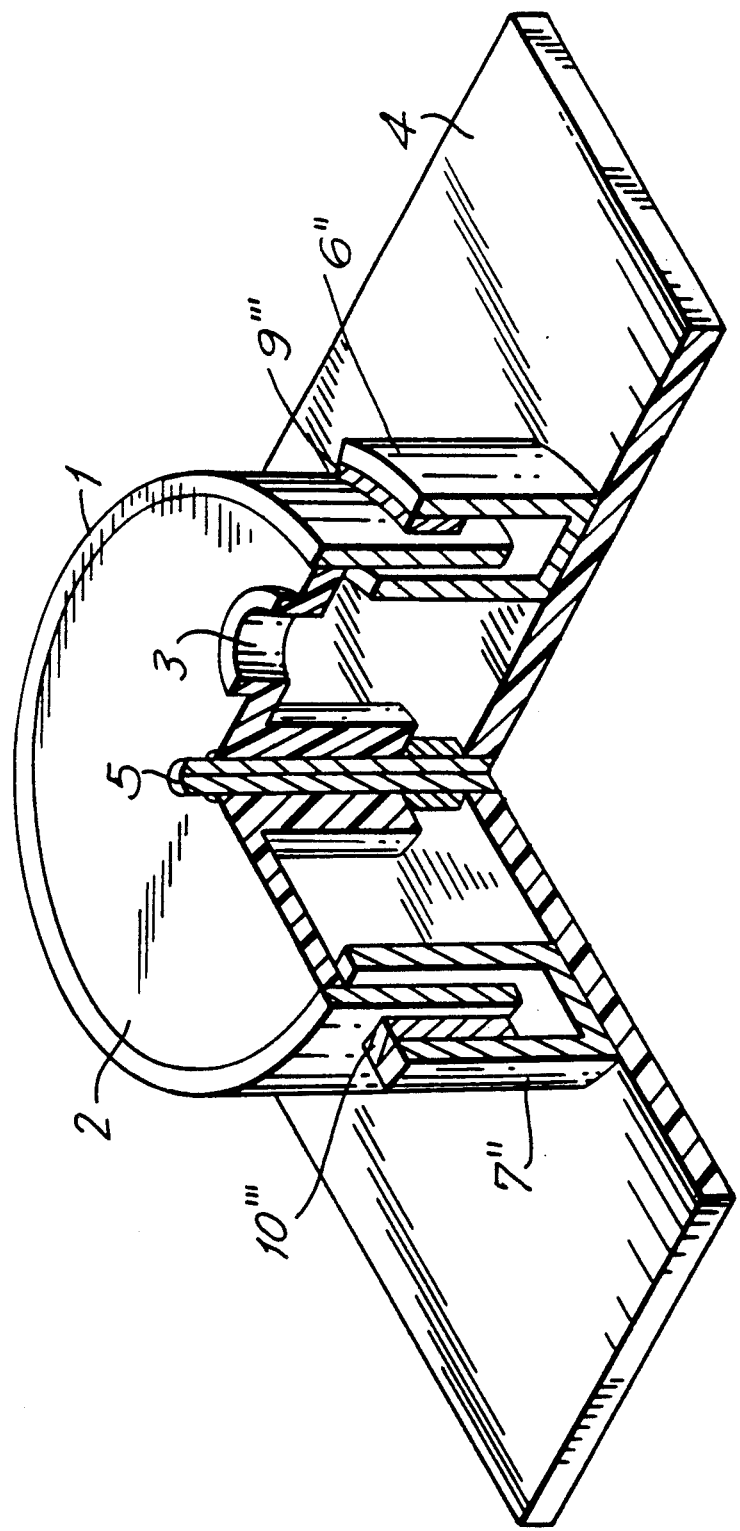

ACTUATOR AND METHOD OF MANUFACTURING THEREOF

BACKGROUND OF THE INVENTION

The invention is directed to an actuator and in particular to a magnet actuator for driving an objective lens movable in two dimensions. The actuator is supported about a shaft being movable rotationally about the shaft and movable rectilinearly in the axial direction of the shaft.

Two dimensional actuators drive the objective lens of an optical head in, for example, an optical disk memory drive, in a first rotational direction ($\theta$) and a second rectilinear direction (Z) in the axial direction of the shaft. These two dimensional actuators are known as $\theta$ - Z actuators. The majority of prior art $\theta$ - Z actuators are moving coil actuators such as is shown in Japanese Laid-Open Unexamined Patent Application No. 210456/82. A second type of two dimensional actuator is a moving magnet objective lens actuator such as is shown in Japanese Laid-Open Unexamined Patent Application No. 37830/88.

The moving coil actuator has been satisfactory. However, it suffers from the disadvantages that the feeder line disconnects from the moving coil, the bond deteriorates due to overheating of the coil and the coil changes due to thermal deformation resulting from the overheating of the coil.

Additionally, the process for connecting the feeder line to the moving coil is intricate and troublesome. The feeder line also exerts adverse influences during high speed operation of the unit. Furthermore, non-uniform configurations of the coil cause an imbalance in the movable unit's mass causing a higher order resonance preventing high speed operation. Accordingly, when the moving coil actuator is applied to an optical head in an optical disk memory device the optical disk rotation frequency cannot be increased, limiting the data transfer rate. Modification of the coil's specifications i.e. the number of lines, line diameter and the like, will lead to variations in mass of the movable unit. Accordingly, trial and error processing requiring modification in the design of the actuator must be performed to obtain in optimal coil specifications.

The moving magnet actuator has also bee satisfactory However, it suffers from the shortcoming that a plurality of magnet circuits and magnets are necessary to obtain the desired two dimensional operations. This type of construction results in a complicated structure. Accordingly the mass of the movable unit often becomes unbalanced. Furthermore, an increase in the movable unit's weight adversely affects the high speed response of the actuator. Additionally, due to the complex structure, production of a moving magnet actuator is expensive.

Accordingly, it is desirable to provide an actuator suitable for use as an objective lens of an optical head capable of operation in two dimensions which overcomes the shortcoming of the prior art devices described above by using a cylindrical magnet having multi-polar magnetization in a radial direction, having magnetic boundaries in both a circumferential direction and axial direction and a yoke having magnetic poles each facing the magnetic boundaries.

SUMMARY OF THE INVENTION

Generally speaking, in accordance with the invention, an actuator rotatable about a support shaft and movable rectilinearly in the axial direction of the support shaft includes a cylindrical magnet. The magnet is multi-polar magnetized in the radial direction and has magnetic boundaries in the circumferential and axial directions. A yoke having magnetic poles facing the magnetic boundaries is disposed about the magnet. The yoke is wound with a coil to move the magnet rectilinearly in an axial direction of the support shaft by a magnetic attraction and repulsion between the cylindrical magnet and the magnetic poles generated on the surface of the yoke opposite the magnetic boundaries and is also rotated about the support shaft by the magnetic attraction and repulsion between the magnet and the magnetic poles of the yoke interacting with the magnetic boundaries in the axial direction.

The surface of the yoke may extend to a position opposed to the magnetized boundaries. The coil is attached to the yoke at the position of the yoke opposed to the boundary.

A cylindrical magnet is provided in which multipolarization is effected and the weight of the movable unit decreases as the thickness is reduced. The magnets may be resin bonded type magnets exhibiting high productivity and workability, particularly Sm - Co system resin bonded type magnets having high performance. With such a cylindrical magnet sufficient magnet properties can also be obtained by a magnet wherein Sm is partially replaced with at least one kind of light rare metal, the main components of which are Nd, Ce and Pr, or by a rare earth metal R - Fe - B system bonded type magnet.

High performance R - Fe - B system magnets can also be used. Sintered magnets in which the fundamental composition includes R, Fe, B and Zr can also be used. Also usable is an R - M - X system casting magnet. M should be at least one kind of transition metal and X must be at least one kind of group 111B element.

Accordingly, it is an object of this invention to provide an improved actuator.

Another object of this invention is to provide an actuator operable at a high speed while exhibiting a well balanced movable unit mass which does not require electricity to be supplied to the movable unit.

A further object of this invention is to provide an actuator which eliminates thermal deformation of the coil and thermal deterioration of bonding.

Yet another object of this invention is to provide an actuator which allows control over the gaps between magnetic circuits.

Still another object of this invention is to minimize inconsistencies in coil weight and production of a resistance within the actuator resulting in increased productivity.

A further object of the present invention is to provide an actuator in which low inductance does not decrease the sensitivity of the actuator in higher frequency ranges, increasing applicability of the actuator to high speed actuators.

Another object of this invention is to provide a two dimensional driving actuator using a single piece magnet.

Still other objects and advantage of the invention will in part be obvious and will in part be apparent from the specification.

The invention accordingly comprises the several steps and the relationship of one or more of such steps with respect to each of the others, and the article possessing the features, properties, and the relation of elements, which are exemplified in the following detailed disclosure, the scope of the invention will be indicated in the claims.

BRIEF DESCRIPTION OF THE DRAWINGS

For a fuller understanding of the invention, reference is had to the following description taken in connection with the accompanying drawings, in which:

FIG. 1b is front elevational view of the actuator of FIG. 1a;

FIG. 1c is a sectional view taken along the line 1(c)-1(c) of FIG. 1a;

FIG. 2b is a front elevational view of the objective lens actuator of FIG. 2a;

FIG. 2c is a sectional view taken along the line 2(c)-2(c) of FIG. 2a;

FIG. 7 is a sectional perspective view of an objective lens actuator constructed in accordance with another embodiment of the invention;

DETAILED DESCRIPTION OF THE PREFERRED EMBODIMENT

Figure 1A:
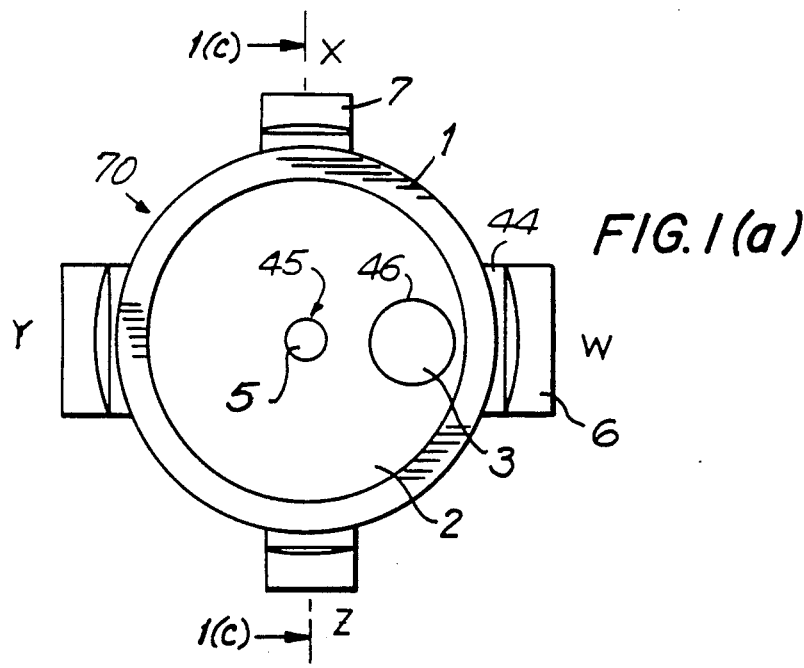
FIG. 1a is a top plan view of an objective lens actuator constructed in accordance with the invention.
Figure 1B:
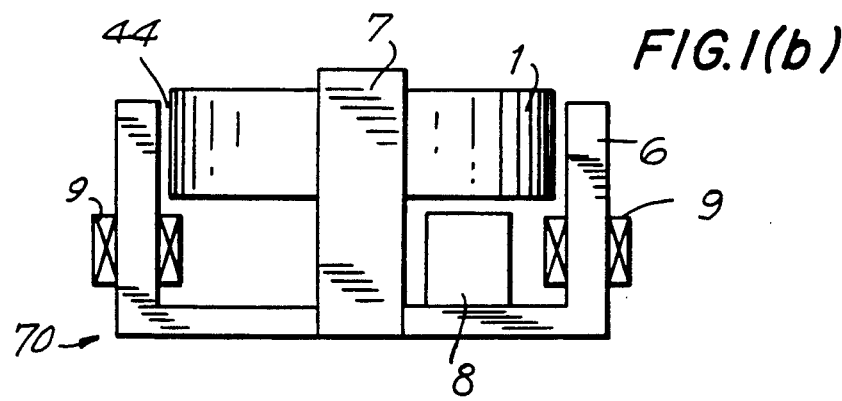
Figure 1C:
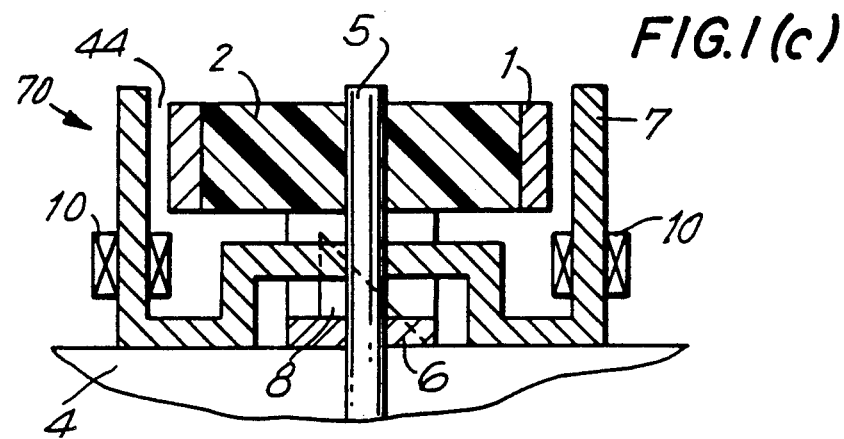
Figure 3:
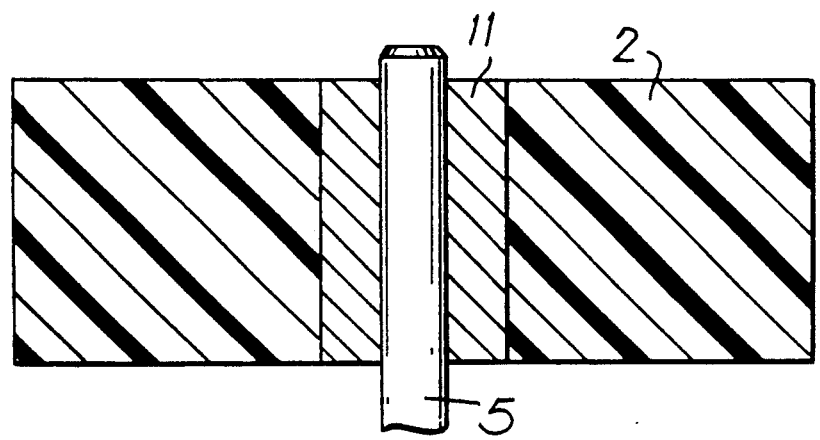
FIG. 3 is a sectional view of an actuator constructed in accordance with another embodiment of the invention.
Figure 4:
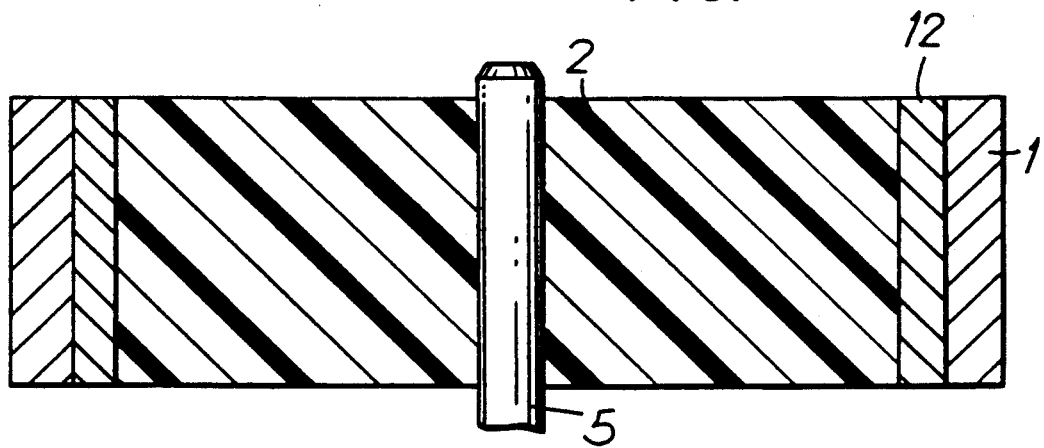
FIG. 4 is a sectional view of an actuator constructed in accordance with another embodiment of the invention.

Reference is made to FIGS. 1a-1c wherein an actuator generally indicated as 70 constructed in accordance with the invention is shown. A support shaft 5 extends from base 4. A plastic lens frame 2 including a central portion 45 is supported about support shaft 5 with central portion 45 being shaped to form a bearing. A magnet 1 having a cylindrical configuration is affixed to plastic lens frame 2. Shaft 5, lens frame 2 and magnet 1 form a movable unit. A separate plastic sleeve 11 affixed within plastic lens frame 2 may act as a bearing as shown in FIG. 3. Additionally, as seen in FIG. 4 a yoke ring 12 may be disposed between magnet 1 and lens frame 2 to act as a back yoke.

An objective lens 3 is affixed to an objective lens mounting portion 46 so that objective lens 3 is rotatable about shaft 5 and is rectilinearly movable in the axial direction of support shaft 5 permitting two dimensional movement of a laser beam focus.

Figure 5:
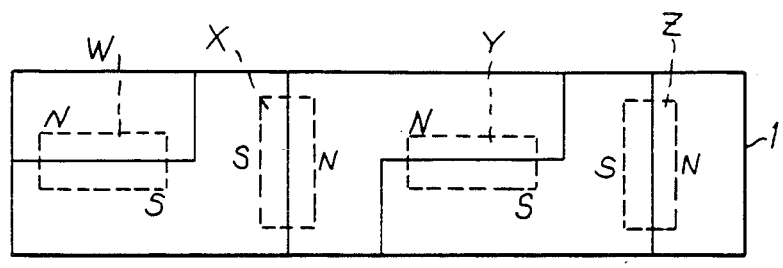
FIG. 5 is a diagrammatic view of the magnetic pattern of a magnet constructed in accordance with the invention.

The magnetization pattern of magnet 1 is effected in the radial direction of cylindrical magnet 1 as seen in FIG. 5. The N - pole and S - pole appear on the surface of magnet 1 on either side of a magnetic boundary. Poles W and Y extend a length circumferentially about magnet 1 and the poles X and Z extend a length along the height of magnet 1 in the axial direction of shaft 5. The ratio of the areas between the N - pole and S - pole is substantially one, depending on the facility of magnetization. The area ratio, however is not limited to this number.

A yoke 6 and a yoke 7 rest on base 4 and are disposed across a gap 44 from the outer circumference of magnet 1. Coils 9 are wound about yoke 6 and control the focusing of objective lens 3. Coils 10 are wound about yoke 7 and control the tracking of objective lens 3. The magnetic poles of yokes 6 and 7 may face the magnetized boundaries of magnet 1 depicted in FIG. 5. Yokes 6 and 7 are fixed relative to the moveable unit.

Magnetic poles W and Y serve as yoke terminals of yoke while magnetic poles X and Z serve as yoke terminals of yoke 7. Repulsive forces are generated when the same poles of magnet 1 are disposed adjacent the identical magnetic poles of yokes 6 and 7, so that the position at which the magnetic poles face the magnetized boundaries is most stabilized. For example, when region W of magnet 1 faces yoke 6 corresponding to W and region Y of magnet 1 faces region Y of yoke 6. This results in the movable portion of actuator 70 being neutrally held eliminating the necessity for neutral holding spring.

As can be seen from FIG. 1a, the width of magnetic poles X and Z are narrower than magnetic poles W and Y. If objective lens 3 is set in position opposite magnetic pole W or Y, an air space is formed to admit the laser beam between focusing magnet poles W and Y and tracking magnetic poles X and Z. A reflection mirror 8 is disposed below objective lens 3 to provide a thin structure. When a control current flows through coils 9, 10 to generate an identical polarity in the two distinct sides of the same yoke, 6, 7 respectively, magnet 1 moves minutely in the vicinity of the neutral position.

Actuator 70 is not limited to a particular arrangement of coils in which the coils are wound directly on the yoke. A coil bobbin may be employed. However, when coils are directly wound on the yokes, sufficient insulation must be provided. Additionally actuator 70 includes no coil in gap 44 between magnet 1 and the magnetic poles provided by yokes 6, 7. Gap 44 can therefore be minimized in size by enhancing the dimensional accuracy of magnet 1. Actuator 70 accordingly has good current thrust (torque) characteristics providing a high efficiency.

Figure 2A:
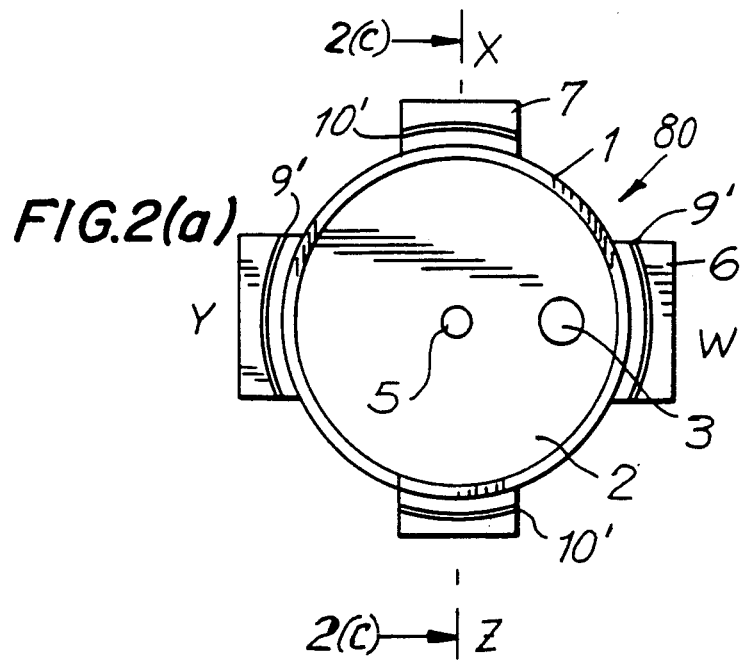
FIG. 2a is the top plan view of an objective lens actuator constructed in accordance with a second embodiment of the invention.
Figure 2B:
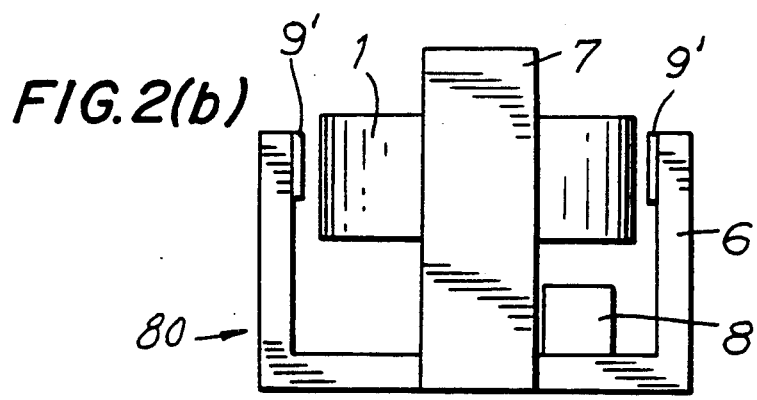
Figure 2C:
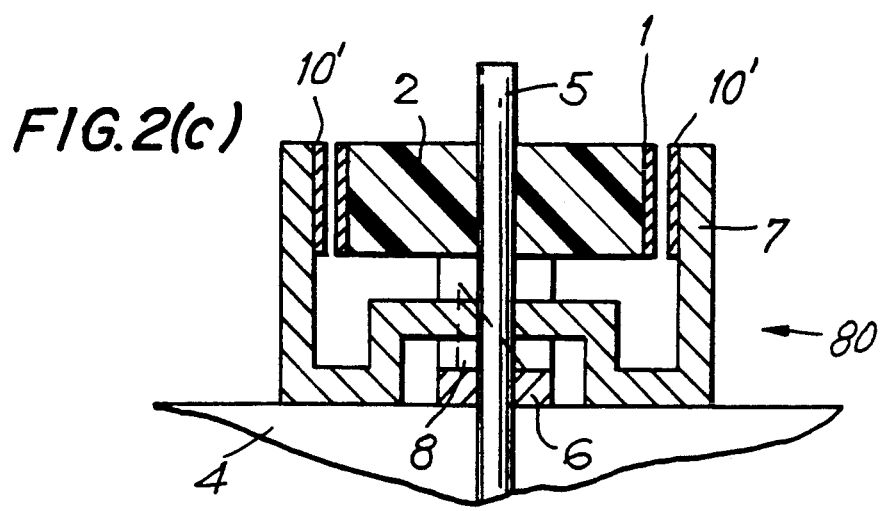

Reference is now made to FIGS. 2a–2C wherein an actuator, generally indicated at 80, constructed in accordance with a second embodiment of the invention, is provided. Actuator 80 is similar to actuator 70 with the exception of the coils and like reference numerals are used to indicate like parts.

Coils 9', 10' are affixed to yokes 6, 7 respectively without the winding of the coils about each respective yoke. As can be seen from FIGS. 2b, 2c coils 9' affixed to yoke 6 are utilized for focusing control while coils 10' affixed to yoke 7 are utilized for tracking control. Coils 9', 10' may be pasted to yokes 6, 7.

Pasting coils 9', 10' involves an arrangement in which a substrate is formed of heat resistant polyamide while coils 9', 10' themselves are composed of copper applied by a plating method. A coil pattern is created by photolithography patterning. With this method it becomes possible to reduce both coil width and pitch resulting in a larger number of turns per coil. Coils 9', 10' can be readily multi-layered depending upon the design. Coils 9', 10' are also coated with epoxy resin for protection as well as insulation.

Because of low inductance the sensitivity of the coils produced as discussed above does not decrease even in the higher frequency ranges. Accordingly, high speed actuators can be manufactured utilizing these coils. Actuator 80 lends itself to an optical objective lens actuator for an optical disk memory adapted for high speed rotation. A photolithography-based coil has high productivity, because inconsisticies in quality are minimized. The coil material in this case maY include aluminum and an aluminum copper alloy, in addition to copper. The manufacturing method itself is not confined to plating, but a drying method such as sputtering may also be utilized. Additionally, coil insulation is not limited to the process described above.

Depending upon the application of the actuator, a required number of turns of electric wire may be employed for the coil rather than utilizing photolithography. Coil patterning associated with printing techniques are also practicable.

Actuators 70, 80 provide an assembly which does not require a support member such as a spring for holding the movable unit of the actuator in a neutral condition. Additionally, a higher resonance of the support members inherent in the prior art actuators can be avoided. The mass distribution of the movable unit of actuators 70, 80 can actually be determined at the design stage producing a structure of well balanced mass resulting in stable high speed operation. Conventional moving coil actuators have an imbalance in mass in the movable unit due to the non-uniformity in the configuration of the coil. This further causes unnecessary parasitic vibrations and stick slip in a slide surface of the bearing. These problems are obviated by actuators 70, 80.

Additionally, conventional moving magnet actuators require combining a plurality of magnet complicating the construction and resulting in a difficult assembly process. By providing a cylindrical unitary magnet having a plurality of the poles thereon actuators 70, 80 are easily assembled. Additionally, the magnet employed in actuators 70, 80 is preferably light in weight having a high performance.

Figure 6:
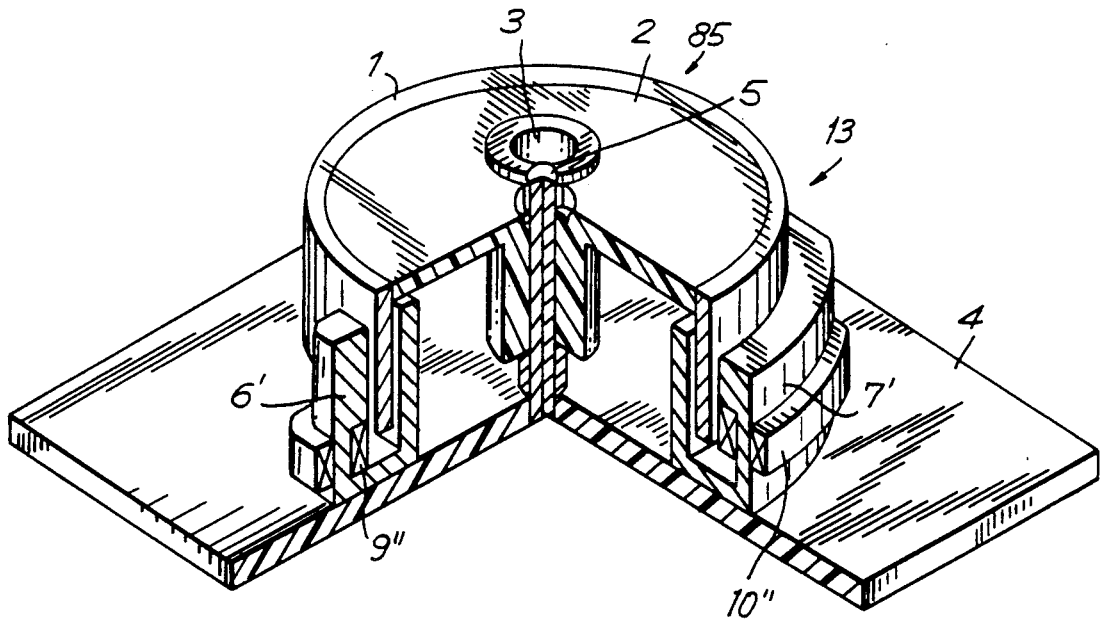
FIG. 6 is a sectional perspective view of another embodiment of an objective lens actuator constructed in accordance with the invention.

The actuator, constructed in accordance with the invention need not be limited to the constructions of actuators 70, 80 but may be applied to a wide variety of magnetic circuits such as actuator 85 shown in FIG. 6 A magnetic circuit is independently provided for each magnetic pole. In FIG. 6, each yoke 6' is formed as a U-shape element with one leg on either side of magnet 1 and a coil 9" wrapped about an outer leg. Similarly shaped yokes 7" each have a coil 10" wrapped about it. In FIG. 7, each U-shaped yoke 6", 7" is provided with a pasted on coil 9''', 10" respectively, of the type described in connection with FIGS. 2a–2c.

Figure 8A:
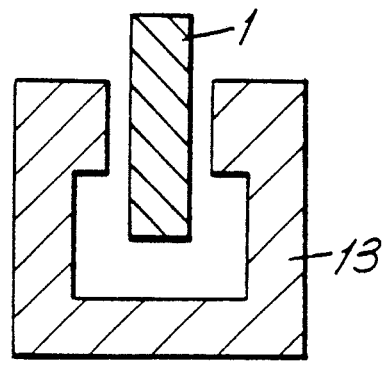
FIG. 8a is a sectional view of a magnetic circuit constructed in accordance with one embodiment of the invention.
Figure 8B:
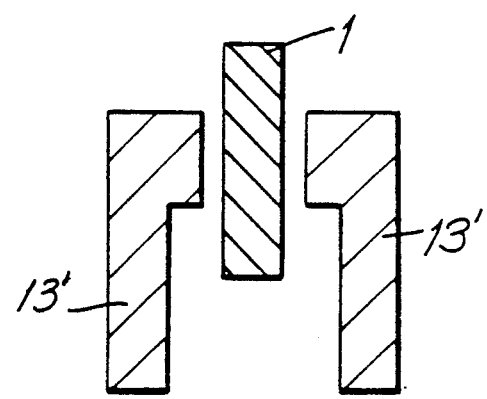
FIG. 8b is a sectional view of a magnetic circuit constructed in accordance with another embodiment of the invention.
Figure 8C:
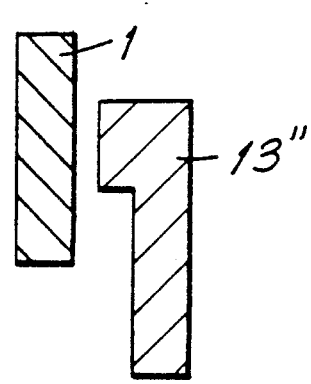
FIG. 8c is a sectional view of a magnetic circuit constructed in connection with another embodiment of the invention.

The structure of the magnetic circuit may be varied as shown in FIG. 8a in which a yoke 13 is formed as a single body and is provided at the inner circumference and outer circumference of magnet 1. A second magnetic circuit, shown in FIG. 8b includes two separate yokes 13' placed on either side of magnet 1. A third embodiment is shown in FIG. 8c in which a single yoke 13" forms a magnetic pole at the outer circumference of magnet 1. In each of these structures, a proper spring and dumper for holding the movable portion of the actuator in a neutral position is provided. If the magnetic pole of each magnetic circuit is disposed only outwardly of the magnet as depicted in FIG. 8c, efficiency of the actuator can be improved by affixing yoke ring 12 at the inner circumference of magnet 1 as shown in FIG. 4.

Figure 9A:
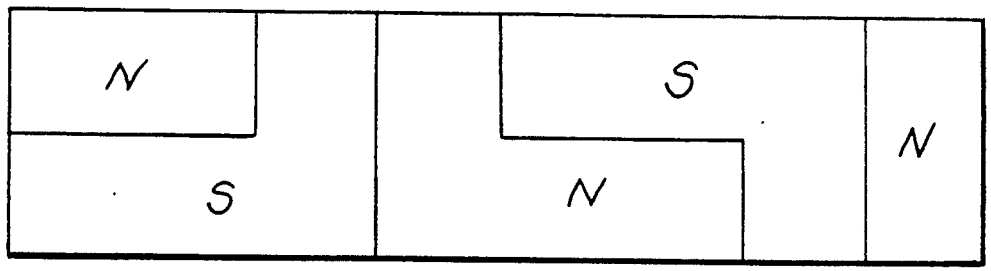
FIG. 9a is a diagram of a magnetic pattern of a magnet constructed in accordance with another embodiment of the invention.
Figure 9B:
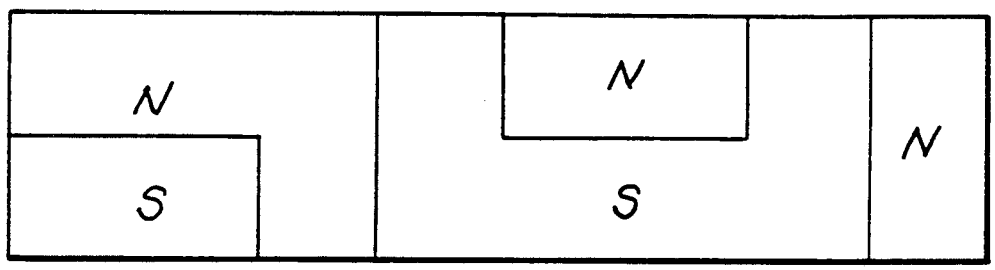
FIG. 9b is a diagram of a magnetic pattern of a magnet constructed in accordance with another embodiment of the invention.

In addition to the embodiment shown in FIG. 5, the possible magnetized pattern of magnet 1 may be as illustrated in FIGS. 9a, 9b.

As discussed above, the feeder line connected to the movable portion of the actuator can be eliminated in actuators 70, 80 and 85. Accordingly, no problems arise with disconnection of the feeder line. Actuators 70, 80 and 85 are simplified because the process for connecting the feeder line to the movable portion of the actuator is no longer required.

Figure 10:
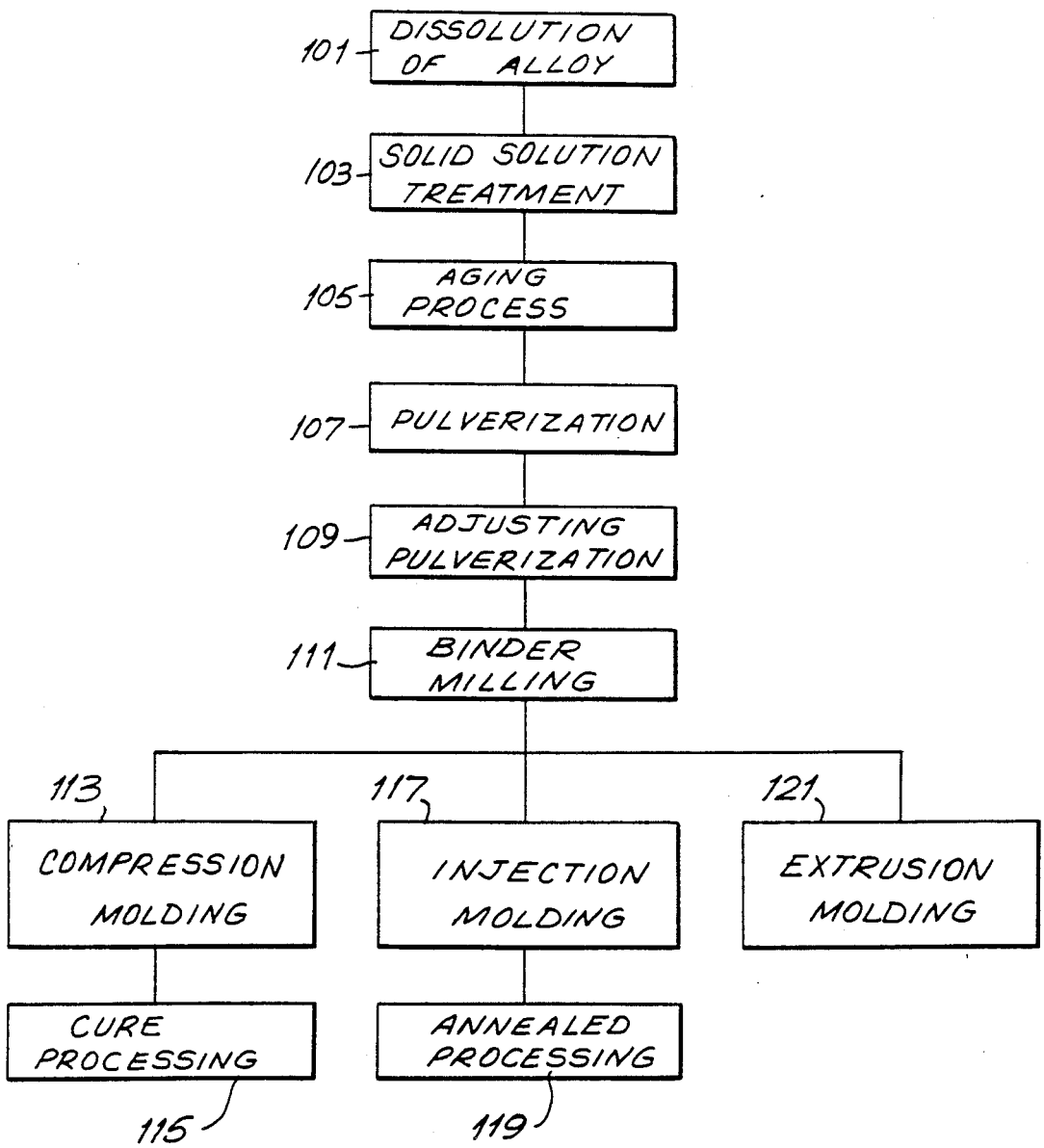
FIG. 10 is a flow chart for manufacturing a Sm - Co resin bonded magnet in accordance with the invention.

FIG. 10 illustrates the production steps of a cylindrical resin bonded Sm - Co system type magnet. In each case the magnet is formed into a cylindrical shape by a compression molding method, an injection molding method or an extrusion molding method. It is desirable in order to obtain the multi-polar magnetization in the radial direction that the cylindrical magnet defined as a component of the invention is invested with radial anisotropy. Since the radial anisotropic Sm - Co system type magnet can be manufactured with high productivity, it is highly advantageous. The high magnet performance brings about a decrease both in size and weight of the movable objective actuator unit. In addition, since the gaps between the surface of magnet and the magnetic poles can be narrowed, high dimensional accuracy can easily be obtained.

A magnet A is formed by first dissolving in step 101 an alloy having a composition of Sm $(Co_{0.672} Cu_{0.08} Fe_{0.22} Zr_{0.028})_{8.35}$ in an induction furnace in accordance with step 101. The resulting ingot is solid solution treated in an Argon (Ar) gas atmosphere at temperature between about 1120° and 1180° C. for about 5 hours in accordance with step 103 and further undergoes an aging process at about 850° C. for about 4 hours in accordance with step 105. The $Sm_2TM_{17}$ alloy (where TM is a transition metal) obtained is pulverized in accordance with step 107 until the mean particle diameter becomes substantially 20 $\mu$m in accordance with step 109 (Fisher Sub-Sieve Sizer). A magnetic compound is formed by adding 2% by weight of thermoset two-part epoxy resin and mixing it with 98% by weight of the powder in accordance with step 111. The magnetic compound is formed to assume a cylindrical configuration by subjecting it to radial orientation in a magnetic field by means of a powder forming magnetic field pressing device in accordance with step 113. Cure processing is performed in accordance with step 115 to form the magnet A. By using type of compression molded magnet it is possible to obtain an actuator with a high speed response.

A magnet B is formed by performing steps 101-109 described above. A magnetic compound is produced by mixing 40% by volume of nylon-12 with 60% by volume of the magnetic powder in accordance with step 111. The magnetic compound assumes a cylindrical configuration by subjecting it to radial orientation in a magnetic field by a magnetic injection molding machine in accordance with step 117. The cylindrical magnet is then annealed in accordance with step 119 to form a magnet B.

A magnet C is formed by performing steps 101-109 described above. A magnetic compound is formed by mixing at about 200° C. 92% by weight of the magnetic powder with 8% by weight of nylon-12 in accordance with step 111. The resulting granulated particles, having an outside particle diameter between about 3 to 6 mm, are extrusion molded and subjected to the radial orientation in the magnetic field by an extrusion molding machine in accordance with step 121, to form a cylindrically shaped magnet C.

The injection molded magnet and the extrusion molded magnet have slightly lower magnetic performance but higher productivity than the compression molded magnet. However, it is quite easy, particularly in the case of an extrusion molded magnet, to assume a thin cylindrical configuration. An objective lens actuator employing the injection or extrusion molded magnets can easily be applied to a read-only optical disk memory drive or an optical disk memory drive including an optical disk whose rotational frequency is low.

A resin bonded Sm - Nd -Ce - Co system magnet is formed, with partial replacement of Sm-Co by Nd-Ce, by performing steps 101-115 shown in FIG. 10. An $R_2TM_{17}$ alloy whose composition is $Sm_{0.5} Nd_{0.4} Ce_{0.1} (Co_{0.672} Cu_{0.08} Fe_{0.22} Zr_{0.028})_{8.35}$ is pulverized until the mean particle diameter is about 80 $\mu$m in accordance with step 109. About 98% by weight of the resulting powder is then mixed with about 2% by weight of thermoset two-part epoxy resin in accordance with step 111. The magnetic compound produced undergoes radial orientation in the magnetic field by compression molding in accordance with step 113 to obtain a cylindrically shaped magnet. The cylindrical magnet is then subjected to cure processing in accordance with step 115 to form a magnet D.

The Nd-Ce replacement of Sm-Co system resin bonded type magnet is slightly lower in magnetic performance, however, it is more advantageous in terms of availability of materials and costs than the Sm-Co system magnet. Where Sm is partially substituted by Pr to form magnet E, sufficient magnetic properties are also obtained. Magnet E is also advantageous in terms of supply of material and cost. Sufficient high speed operations are obtained using magnets D and E.

Figure 11:
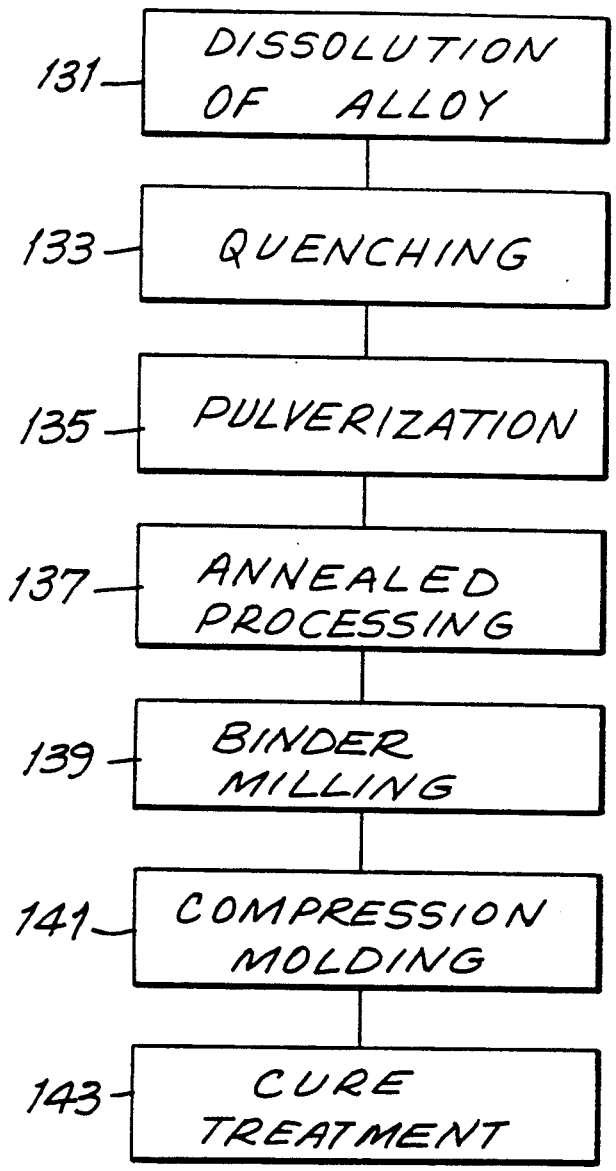
FIG. 11 is a flow chart for processing a Nd-Fe-B resin bonded magnet in accordance with the invention.

FIG. 11 illustrates the process of manufacturing a resin bonded Nd-Fe-B system magnet F. An alloy having a composition of $Nd_{13}Fe_{82.7}B_{4.3}$ is processed to form a ribbon in which crystal and amorphous are intermixed on the basis of a melt-spin method in accordance with step 131. The dissolved alloy is quenched in accordance with step 133. A magnetic powder is formed by pulverizing the magnetic compound in accordance with step 135 and it is annealed in accordance with step 137. The magnetic powder is mixed with epoxy resin in accordance with step 139. The mixture is compression molded to assume a cylindrical shape in accordance with step 141 and it is subjected to cure processing in accordance with step 143 to form magnet F. Since a high workability resin bonded Nd-Fe-B system magnet can be manufactured, it is advantageous in terms of supply of material and costs to utilize a magnet of this type in the objective actuator of the invention.

Figure 12:
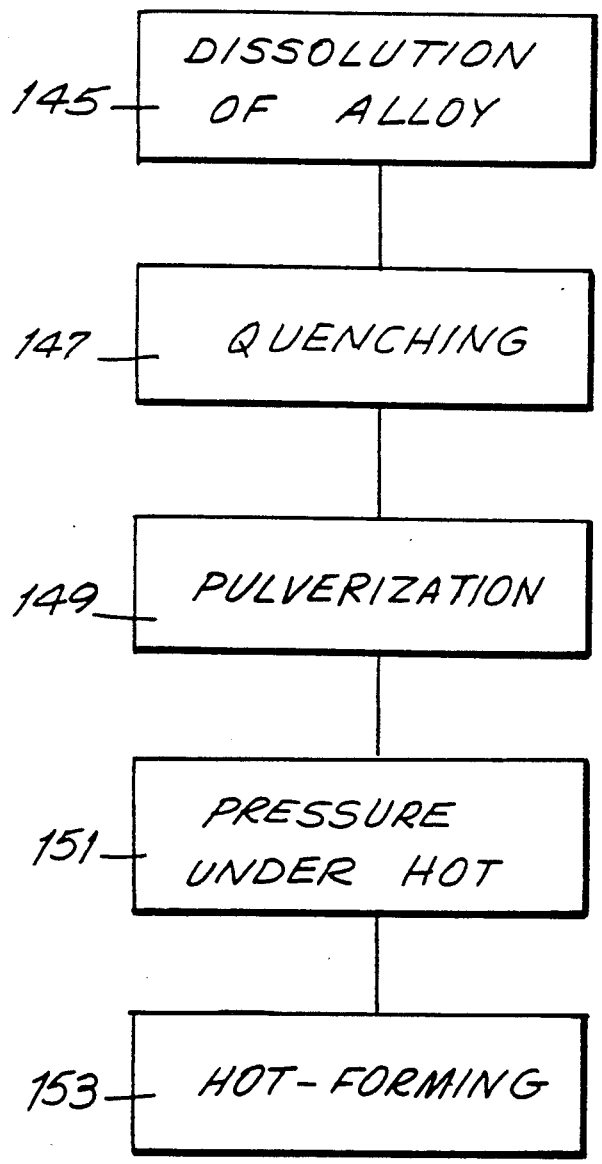
FIG. 12 is a flow chart for processing a Nd-Fe-B magnet in accordance with the invention.

FIG. 12 illustrates the process of manufacturing a Nd-Fe-B system magnet G and a Nd-Fe-B system magnet H. An alloy having a composition of $Nd_{13}Fe_{82.7}B_{4.3}$ is dissolved by the melt-spin method in accordance with step 145 to form a ribbon in which crystal and amorphous are intermixed. The mixed matter is quenched in accordance with step 147 and pulverized in accordance with step 149 to obtain a magnetic powder. The magnetic powder is put into a cylindrical die and hot-pressed in accordance with step 151 to form a magnet G.

Magnet G exhibits excellent magnetic performance because the packing density of the magnetic powder is higher in magnet G than the resin bonded Nd-Fe-B system magnet F. Radial anisotropic magnet H is formed by performing steps 145-51 and hot-forming the magnet in accordance with step 153 under pressure in the radial direction of a cylinder. The high magnetic properties inherent in the Nd-Fe-B system magnet result in an actuator of high speed respondency can be obtained by using Nd-Fe-B system magnets G and H.

Figure 13:
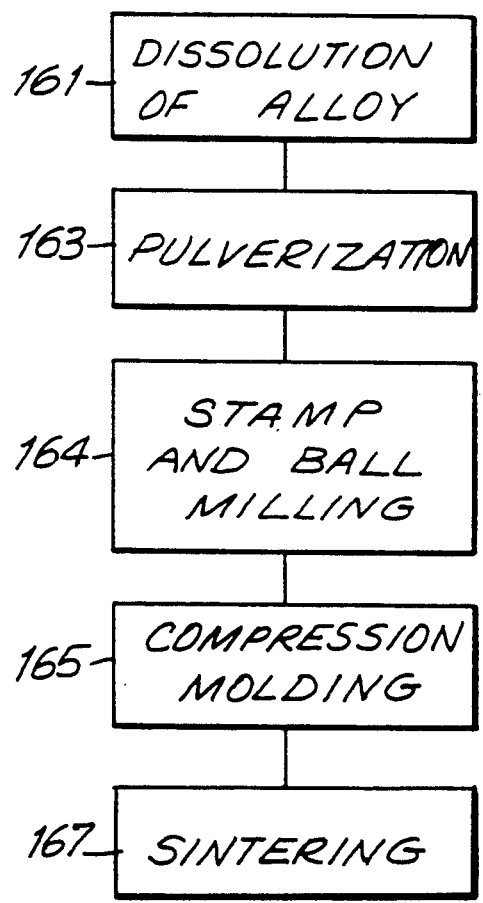
FIG. 13 is a flow chart for processing a sintered magnet having a composition including R - Fe - B - Zr in accordance with the invention.

FIG. 13 illustrates the method of manufacturing a sintered R-Fe-B-Zr magnet I. A magnetic material of $Zr_{2.5} (Ce_{0.2} Pr_{0.2} Nd_{0.6})_{12.5} Fe_{69} Co_9 B_7$ is dissolved in a high frequency induction furnace in an Ar gas atmosphere in accordance with step 161. The dissolved magnetic material is pulverized to have a mean particle diameter between about 3 to 5 $\mu$m in accordance with step 163. The resulting powder is packed into a cylindrical die by a stamp mill and a ball mill in accordance with a step 164. The powder is radially orientated in a magnetic field of about 14 KOe, and the powder is compression molded to form a green compact in accordance with step 165 under a molding pressure of between about 15 to 20 kg/mm². The green compact is sintered at an optimum temperature between about 1000° to 1250° C. in an Ar gas atmosphere in accordance with step 167. If necessary, annealing is carried out at an optimum temperature of about 400° to 1250° C. to form a sintered magnet. Radially anisotropic sintered magnet I exhibits high magnetic performance. It is also advantageous in terms of supply of material and cost. Thus, an objective lens actuator with a high respondence speed is economically provided.

Figure 14:
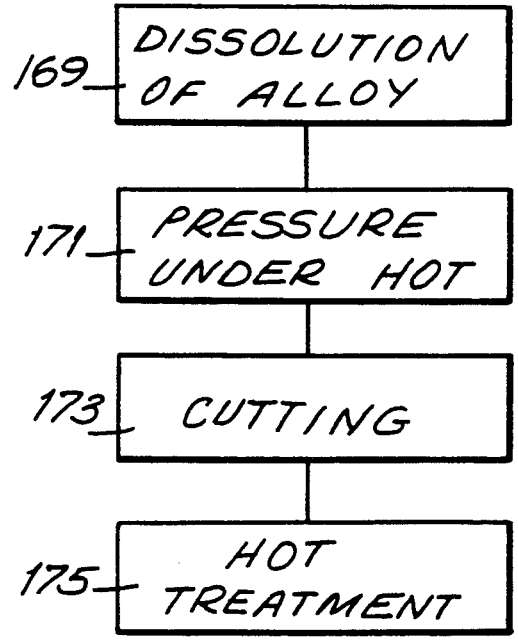
FIG. 14 is a flow chart for processing a R - X - M cast magnet in accordance with the invention.

FIG. 14 illustrates the method of preparing a cast R - M - X system magnet. The R - TM - X magnet contains at least one rare earth metal (R) including Y, La, Ce, Pr, Nd, Sm, Eu, Gd, Tb, Dy, Ho Er, Tm, Yb and Lu. The highest magnetic performance is exhibited by Pr. The magnet contains at least one transition metal (TM), including Fe, Co, Ni and Cu and at least one group 111B (X) element including B, Al and Ga may also be added. In addition, to increase coercivity small amounts of additional elements, such as heavy rare earth metals Dy and Tb, or Si and Mo may be used. The material is weighed to obtain a composition of $Pr_{17}Fe_{76}Cu_2B_5$ which is melted in an induction furnace in accordance with step 169 to obtain a cylindrical cast ingot. A columnar structure is developed in the cylindrically axial direction by a unidirectional method.

Figure 15:
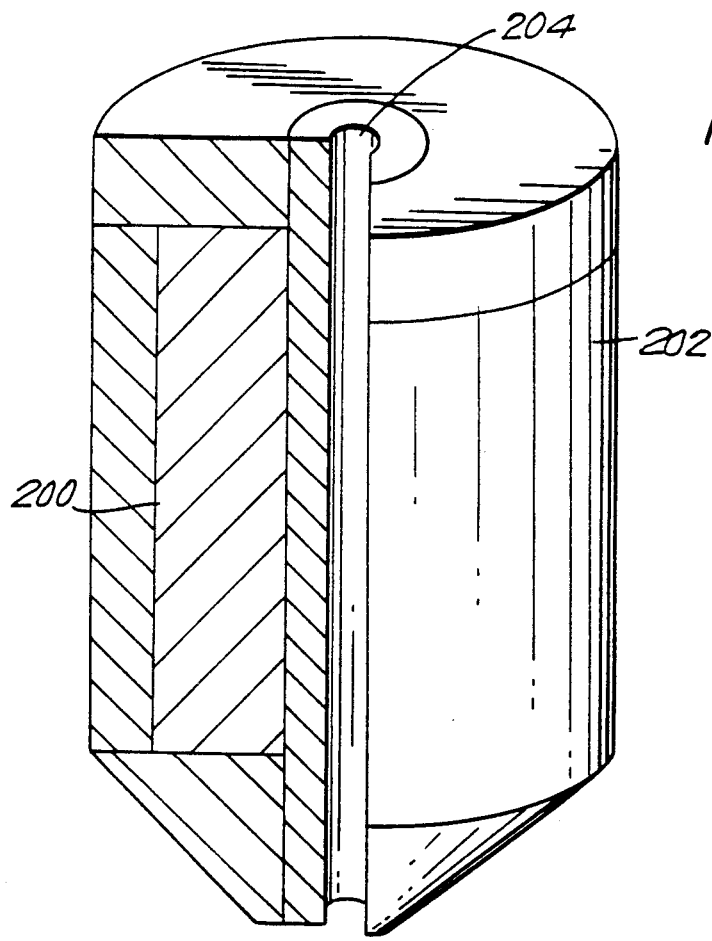
FIG. 15 is a sectional view of a casting ingot and capsule in accordance with the invention.
Figure 16:
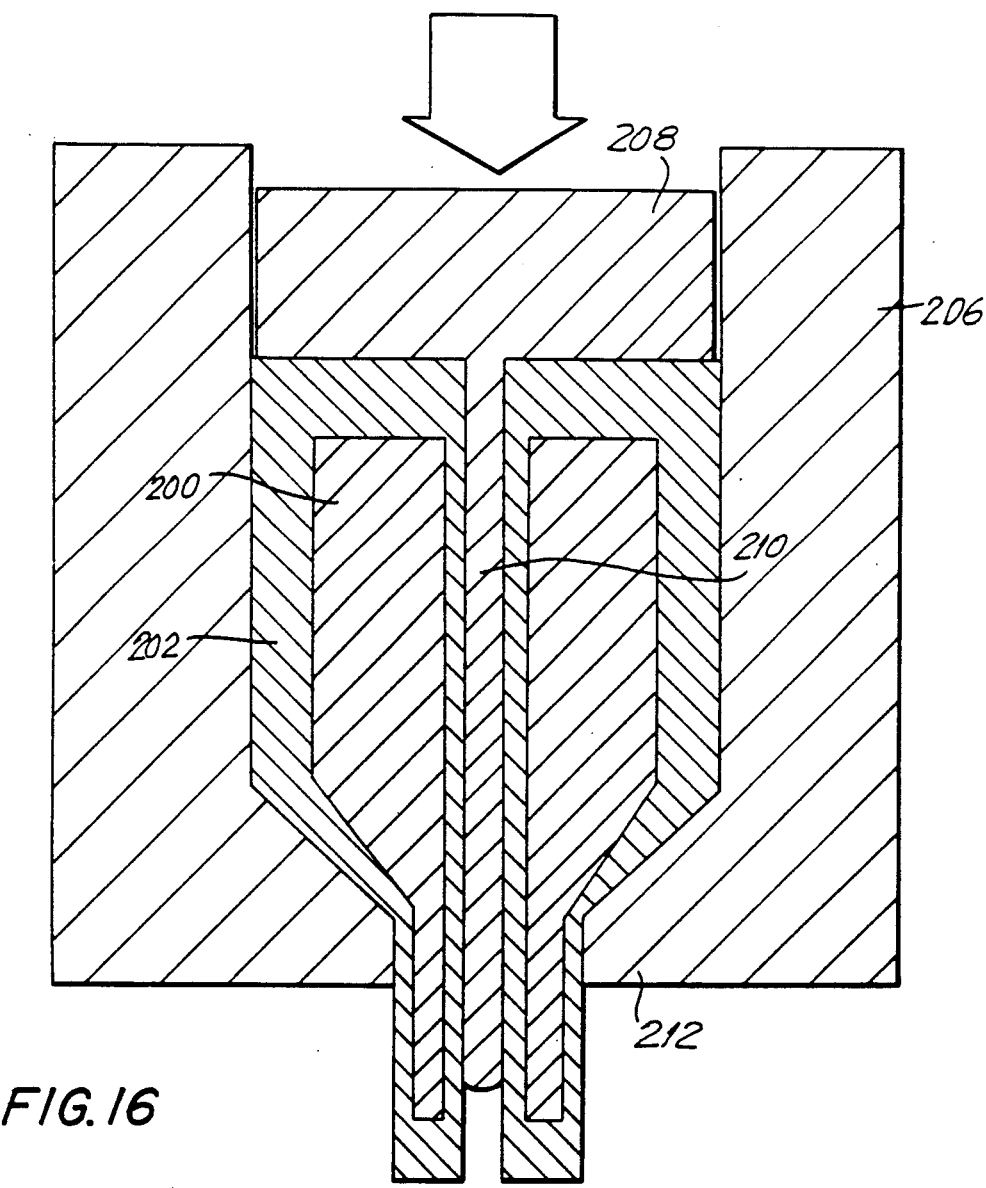
FIG. 16 is a sectional view of a casting ingot and capsule during hot extruding in accordance with the invention.
Figure 17:
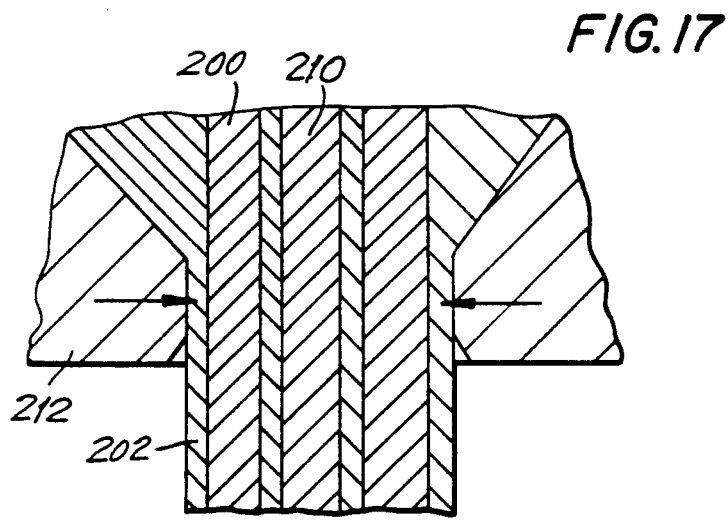
FIG. 17 is a sectional view of a pressurizing unit for use in the hot extruding process in accordance with the invention.

FIG. 15 shows the cast ingot 200 is put into a soft steel capsule 202. Cast ingot 200 is derated and sealed. Capsule 202 is adapted to assume the configuration of cast ingot 200 and is formed with a mandrel hole 204 at its central portion. A illustrated in FIG. 16, the capsule is placed in a container 206 having a die opening 212 at its bottom. A pushing board 208 formed with a mandrel 210 dimensioned for receipt in mandrel hole 204 is positioned about cast ingot 200. Cast ingot 200 is hot-extruded in accordance with step 171 at a temperature of about 850° C. As illustrated in FIG. 17, cast ingot 200 is pressurized in the radial direction by mandrel 210 and the die at the time of extrusion. The cast ingot is orientated in a radial direction. The extruded cast ingot is cut in accordance with step 173 and annealed at about 1000° C. for about 24 hours in accordance with step 175 to form a cylindrical magnet J.

A magnet K is manufactured by performing steps 169–175 on an alloy having the composition $Pr_{17}Fe_{75}Ga_2Al_1B_5$. The magnets J and K obtained are thus produced by casting and hot-forming without undergoing pulverization. Thus, these magnets have a remarkably low concentration of oxygen and are superior in atmospheric resistance. Magnets J and K exhibit high magnetic performance and have high mechanical strength. Additionally, production costs are low. It is therefore possible to obtain an inexpensive, high performance actuator applicable for a wide variety of optical disk memory drives.

Table 1 illustrates the compositions of various magnets and manufacturing process used to obtain them. Table 2 shows the magnetic properties ((BH)max), cost of materials and production and thickness reducing facility of the respective magnets. In Tables 1 and 2, the marks Δ, ○ and ⊙ indicate the order in which the costs decrease. The mark ⊙ is an item of thickness reducing facility indicates the highest degree to which the thickness can be reduced; ○ indicates a relatively high degree thereof and Δ implies that thickness can probably be reduced.

TABLE 1

| Magnet | Composition | Manufacturing Method |
|---|---|---|
| A | $Sm(Co_{0.672}Cu_{0.08}Fe_{0.22}Zr_{0.028})_{8.35}$ | FIG. 10 |
| B | $Sm(Co_{0.672}Cu_{0.08}Fe_{0.22}Zr_{0.028})_{8.35}$ | FIG. 10 |
| C | $Sm(Co_{0.672}Cu_{0.08}Fe_{0.22}Zr_{0.028})_{8.35}$ | FIG. 10 |
| D | $Sm_{0.5}Nd_{0.4}Ce_{0.1}(Co_{0.672}Cu_{0.08}Fe_{0.22}Zr_{0.028})_{8.35}$ | FIG. 10 |
| E | $Sm_{0.5}Pr_{0.5}(Co_{0.672}Cu_{0.08}Fe_{0.22}Zr_{0.028})_{8.35}$ | FIG. 10 |
| F | $Nd_{13}Fe_{82.7}B_{4.3}$ | FIG. 11 |
| G | $Nd_{13}Fe_{82.7}B_{4.3}$ | FIG. 12 |
| H | $Nd_{13}Fe_{82.7}B_{4.3}$ | FIG. 12 |
| I | $Zr_{2.5}(Ce_{0.2}Pr_{0.2}Nd_{0.6})_{12.5}Fe_{69}Co_9B_7$ | FIG. 13 |
| J | $Pr_{17}Fe_{76}Cu_2B_5$ | FIG. 14 |
| K | $Pr_{17}Fe_{75}Ga_2Al_1B_5$ | FIG. 14 |

TABLE 2

| Magnet | (BH) max (MGOe) | Cost | Thickness reducing facility |
|---|---|---|---|
| A | 15.0 | ○ | ○ |
| B | 9.5 | ⊙ | ○ |
| C | 8.7 | ⊙ | ⊙ |
| D | 14.2 | ⊙ | ○ |
| E | 14.7 | ⊙ | ○ |
| F | 8.3 | ○ | ○ |
| G | 13.0 | Δ | Δ |
| H | 31.0 | Δ | Δ |
| I | 33.0 | ○ | Δ |
| J | 35.1 | ⊙ | Δ |
| K | 34.3 | ⊙ | Δ |

Figure 18:
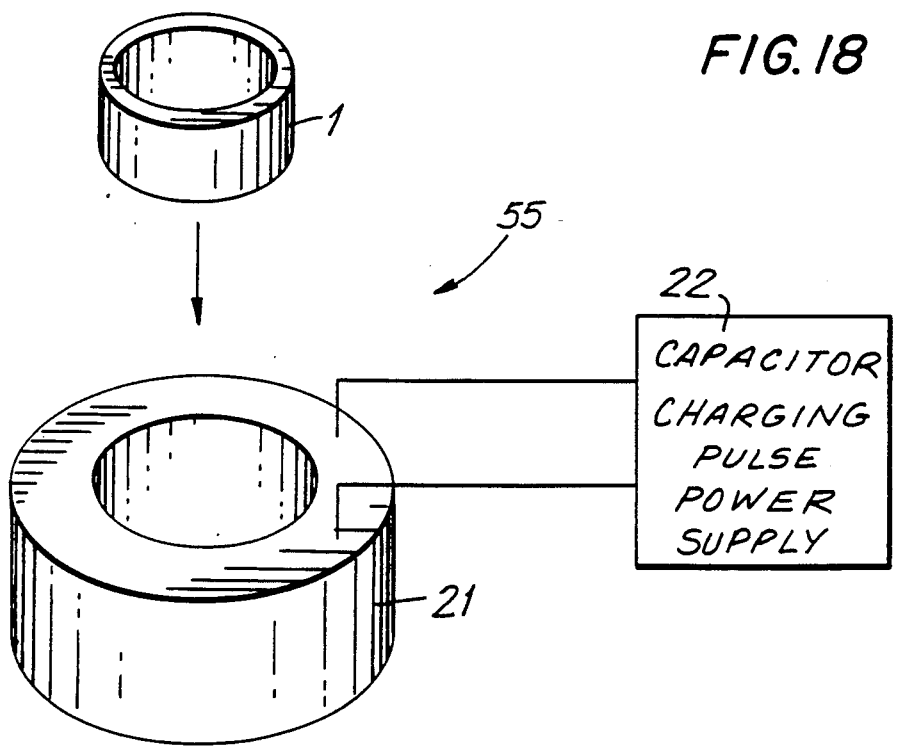
FIG. 18 is a schematic view of a magnetizer constructed in accordance with the magnetizing method of the invention.
Figure 19A:
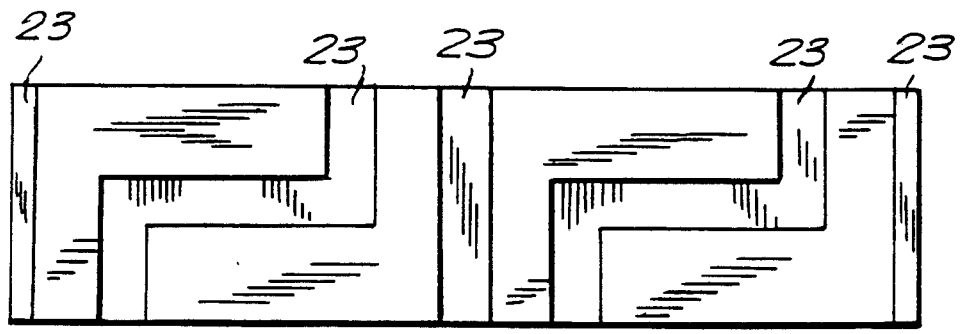
FIG. 19a is a diagram illustrating a magnetized yoke constructed in accordance with the invention.
Figure 19B:
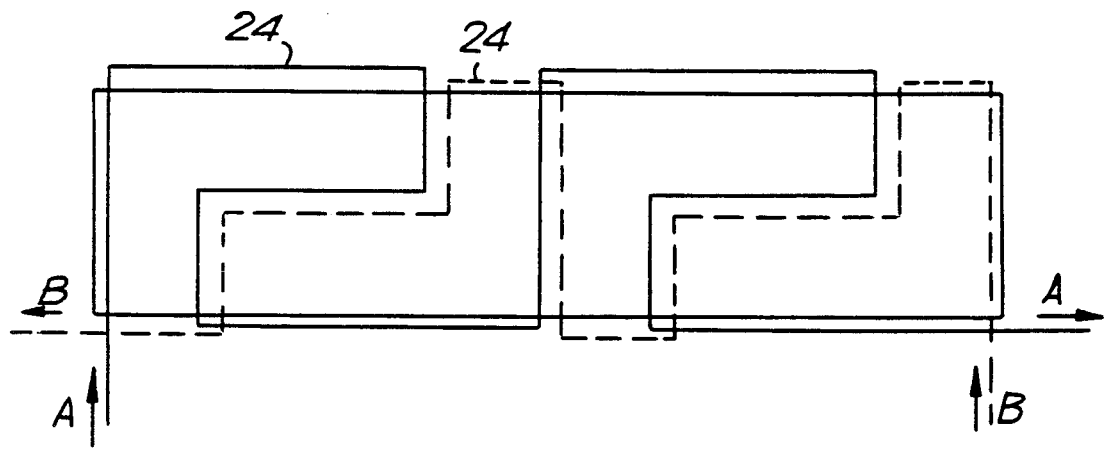
FIG. 19b is a diagram illustrating a magnetized yoke in accordance with another embodiment of the invention.

Reference is now made to FIG. 18 wherein a device for magnetizing magnet 1 generally indicated at 55 is shown. Magnetizing device 55 includes a cylindrical magnetizing yoke 21 connected to a capacitor charging pulse power supply 22. A magnetic field two and one half to three times as high as the intrinsic coercivity of the magnet is applied. The inner circumference of magnetizing yoke 21 is formed with grooves 23 as illustrated in FIG. 19a. Yoke 21 is formed of pure iron and groove 23 is wound with electrical wires 24 indicated by solid and broken lines in FIG. 19b. Electric current flows through wires 24 in the manner depicted by arrows A and B. The magnetic field is produced in the axial direction of magnetizing yoke 21 so that a well balanced magnetization is achieved.

Tables 3-1 and 3-2 represent the high speed response of actuators of the type of actuator 70 having varying dimensions e.g. inner and outer diameters, of magnets, the magnets being formed of the materials A through K as shown in Table 2. In the objective lens actuator a focusing direction (axial direction) drivable range of ±1 mm is sufficient and a cylindrical magnet is set at a height of 5 mm taking this range into consideration. If the drivable range differs in other applications the height might be changed correspondingly. The mark ⊙ in the table indicates excellent high speed response; a Δ indicates good high speed response; ○ indicates that high speed operation is possible while the mark—indicates that such a cylindrical magnet is difficult to manufacture.

TABLE 3-1

| Dimension | | High-speed respondency Magnet | | | | | | | | | | |
|---|---|---|---|---|---|---|---|---|---|---|---|---|
| Inside diameter (mm) | Outside diameter (mm) | A | B | C | D | E | F | G | H | I | J | K |
| 10.0 | 10.6 | — | — | Δ | — | — | — | — | — | — | — | — |

TABLE 3-1-continued

| Dimension | | High-speed respondency Magnet | | | | | | | | | |
|---|---|---|---|---|---|---|---|---|---|---|---|
| Inside diameter (mm) | Outside diameter (mm) | A | B | C | D | E | F | G | H | I | J | K |
| | 11.0 | ○ | △ | △ | ○ | ○ | △ | ○ | ○ | — | — | — |
| | 12.0 | ◉ | △ | △ | ○ | ◉ | △ | ○ | ○ | — | ○ | ○ |
| | 14.0 | ○ | △ | △ | ○ | ○ | △ | ○ | ○ | ◉ | ◉ | ◉ |
| | 16.0 | △ | △ | — | △ | △ | △ | △ | △ | △ | △ | △ |
| 15.0 | 15.6 | — | — | △ | — | — | — | — | — | — | — | — |
| | 16.0 | ○ | △ | △ | ○ | ○ | △ | ○ | ○ | ○ | — | — |
| | 17.0 | ◉ | △ | △ | ○ | ◉ | △ | ○ | ○ | ○ | ○ | ○ |
| | 19.0 | ○ | △ | △ | ○ | ○ | △ | ○ | ◉ | ◉ | ◉ | ◉ |
| | 21.0 | △ | △ | — | △ | △ | △ | △ | ○ | ○ | ○ | ○ |
| 20.0 | 20.6 | — | — | ○ | — | — | — | — | — | — | — | — |
| | 21.0 | ◉ | ○ | ○ | ○ | ◉ | ○ | ○ | △ | — | — | — |
| | 22.0 | ◉ | ○ | △ | ◉ | ◉ | △ | ○ | ○ | ○ | ◉ | ◉ |
| | 24.0 | ○ | △ | △ | ○ | ○ | △ | ○ | ◉ | ◉ | ◉ | ◉ |
| | 28.0 | △ | △ | — | △ | △ | △ | △ | ○ | ○ | ○ | ○ |

TABLE 3-2

| Dimension | | High-speed respondency Magnet | | | | | | | | | |
|---|---|---|---|---|---|---|---|---|---|---|---|
| Inside diameter (mm) | Outside diameter (mm) | A | B | C | D | E | F | G | H | I | J | K |
| 30.0 | 30.6 | — | — | △ | — | — | — | — | — | — | — | — |
| | 31.0 | — | ○ | ○ | — | — | △ | — | — | — | — | — |
| | 32.0 | ◉ | ○ | ○ | ○ | ◉ | ○ | ○ | ○ | — | ◉ | ◉ |
| | 34.0 | ○ | △ | △ | ○ | ○ | △ | ○ | ○ | ○ | ○ | ○ |
| | 38.0 | △ | △ | — | △ | △ | △ | △ | △ | △ | △ | △ |
| 40.0 | 40.6 | — | — | △ | — | — | — | — | — | — | — | — |
| | 41.0 | — | △ | △ | — | — | △ | — | — | — | — | — |
| | 42.0 | ◉ | ○ | ○ | ○ | ○ | ○ | ○ | ○ | — | ○ | ○ |
| | 44.0 | ◉ | ○ | ○ | ○ | ◉ | △ | ○ | ○ | ○ | ○ | ○ |
| | 50.0 | ○ | △ | — | ○ | ○ | △ | △ | △ | △ | △ | △ |
| 50.0 | 50.6 | — | — | △ | — | — | — | — | — | — | — | — |
| | 51.0 | — | △ | △ | — | — | △ | — | — | — | — | — |
| | 52.0 | ○ | △ | △ | ○ | ○ | △ | ○ | ○ | — | ○ | ○ |
| | 54.0 | ○ | ○ | △ | ○ | ○ | △ | ○ | ○ | ○ | ○ | ○ |
| | 60.0 | △ | △ | — | △ | △ | △ | △ | △ | △ | △ | △ |

TABLE 4-1

| Dimension | | High-speed respondency Magnet | | | | | | | | | |
|---|---|---|---|---|---|---|---|---|---|---|---|
| Inside diameter (mm) | Outside diameter (mm) | A | B | C | D | E | F | G | H | I | J | K |
| 10.0 | 10.6 | — | — | ○ | — | — | — | — | — | — | — | — |
| | 11.0 | ○ | △ | ○ | ○ | ○ | △ | ○ | ○ | — | — | — |
| | 12.0 | ◉ | △ | ○ | ○ | ◉ | △ | ○ | ○ | — | ○ | ○ |
| | 14.0 | ○ | △ | ○ | ○ | ○ | △ | ○ | ○ | ◉ | ◉ | ◉ |
| | 16.0 | △ | △ | — | △ | ◉ | △ | △ | △ | ○ | ○ | ○ |
| 15.0 | 15.6 | — | — | △ | — | — | — | — | — | — | — | — |
| | 16.0 | ○ | △ | △ | ○ | ○ | △ | ○ | ○ | ○ | — | — |
| | 17.0 | ◉ | △ | △ | ○ | ◉ | △ | ○ | ◉ | ◉ | ◉ | ◉ |
| | 19.0 | ○ | △ | △ | ○ | ○ | △ | ○ | ○ | ○ | ○ | ○ |
| | 21.0 | △ | △ | — | △ | △ | △ | ○ | ○ | ○ | ○ | ○ |
| 20.0 | 20.6 | — | — | ○ | — | — | — | — | — | — | — | — |
| | 21.0 | ◉ | ○ | ○ | ○ | ◉ | ○ | ○ | △ | — | — | — |
| | 22.0 | ◉ | ○ | △ | ◉ | ◉ | △ | ○ | ○ | ○ | ◉ | ◉ |
| | 24.0 | ○ | △ | △ | ○ | ○ | △ | ○ | ○ | ◉ | ◉ | ◉ |
| | 28.0 | △ | △ | — | △ | △ | △ | △ | ○ | ○ | ○ | ○ |

TABLE 4-2

| Dimension | | High-speed respondency Magnet | | | | | | | | | |
|---|---|---|---|---|---|---|---|---|---|---|---|
| Inside diameter (mm) | Outside diameter (mm) | A | B | C | D | E | F | G | H | I | J | K |
| 30.0 | 30.6 | — | — | △ | — | — | — | — | — | — | — | — |
| | 31.0 | — | ○ | ○ | — | — | △ | — | — | — | — | — |

TABLE 4-2-continued

| Dimension | | High-speed respondency Magnet | | | | | | | | | |
|---|---|---|---|---|---|---|---|---|---|---|---|
| Inside diameter (mm) | Outside diameter (mm) | A | B | C | D | E | F | G | H | I | J | K |
| | 32.0 | ◉ | ○ | ○ | ○ | ○ | △ | ○ | ○ | — | ◉ | ◉ |
| | 34.0 | ○ | △ | △ | ○ | ○ | △ | △ | △ | △ | ○ | ○ |
| | 38.0 | △ | △ | — | △ | △ | △ | △ | △ | △ | △ | △ |
| 40.0 | 40.6 | — | — | △ | — | — | — | — | — | — | — | — |
| | 41.0 | — | △ | △ | — | — | △ | — | — | — | — | — |
| | 42.0 | ○ | ○ | ○ | ○ | ○ | ○ | ○ | ○ | — | ○ | ○ |
| | 44.0 | ○ | ○ | ○ | ○ | ○ | △ | ○ | ○ | ○ | ○ | ○ |
| | 50.0 | ○ | △ | — | ○ | ○ | △ | △ | △ | △ | △ | △ |
| 50.0 | 50.6 | — | — | △ | — | — | — | — | — | — | — | — |
| | 51.0 | — | △ | △ | — | — | △ | — | — | — | — | — |
| | 52.0 | ○ | △ | △ | ○ | ○ | △ | ○ | — | — | ○ | ○ |
| | 54.0 | ○ | △ | △ | ○ | ○ | △ | △ | ○ | ○ | ○ | ○ |
| | 60.0 | △ | △ | — | △ | △ | △ | △ | △ | △ | △ | △ |

Tables 4-1 and 4-2 are similar to tables 3-1 and 3-2 but for actuator 80. The actuators described above may be given the quality of high performance, easily miniaturized and produced at low cost by utilizing high performance rare earth magnets to form a movable magnet in combination with the yoke mechanism described in the above embodiment. However, the magnet material composition, manufacturing conditions and magnet dimensions in the foregoing embodiments are by way of example not limiting. These actuators serving as objective lens actuators may also be applied to a variety of optical disk memory drives.

By providing an actuator arranged so that a magnet is rectilinearly moved in the axial direction of its support shaft by magnetic attraction and repulsion between the cylindrical magnet on which multi-polarization has been effected in the radial direction and the magnetic poles generated on the surface of yokes positioned opposite the magnetized boundaries in the circumferential direction and also rotated about the support shaft by magnetic attraction and repulsion between the magnet and magnet poles of the yokes with the magnetic boundaries in the axial direction of the magnet, two dimensional driving can be effected by a single piece magnet actuator. Additionally, problems associated with thermal deformation of the coil and deterioration of associated bonding are obviated while control over the gap dimension between the magnetic circuit can be more easily facilitated.

By providing a cylindrical magnet in which multipolarization is effected and the weight of the movable unit decreases as the thickness is reduced and it becomes quite effective to employ resin bonded type magnets exhibiting high productivity and workability, particularly Sm - Co system resin bonded type magnets having high performance. With such a cylindrical magnet sufficient magnet properties can also be obtained by a magnet wherein Sm is partially replaced with at least one kind of light rare metal, the main components of which are Nd, Ce and Pr or by a rare earth metal R - Fe - B system bonded type magnet which are more advantageous as being in ready supply and inexpensive.

By utilizing high performance R - Fe - B system magnets driving characteristics of the actuator ca be ameliorated. Furthermore, sufficient magnetic properties can also be obtained even by sintered magnets in which the fundamental composition includes R, Fe, B and Zr. This magnet again is advantageous in terms of supply and cost. By employing an R - M - X system casting magnet it becomes feasible to provide a high performance actuator at low cost. However M must be at least one kind of transition metal and X must be at least one kind of group IIIB element.

An actuator in accordance with the invention particularly specially suited to serve as an objective lens actuator which performs focusing and tracking operations in optical disk memory drives due to its excellent two dimension high speed operation. Additionally an actuator which is readily miniaturized and decreased in thickness is provided. Such an actuator may also be applied to accurate positioning devices and manufacturing semiconductor integrated circuits.

By attaching coils to the yoke formed by photolithography as in the embodiment of FIGS. 2a--2c, inconsistencies both in the weight of the coil and in the resistance values are considerably diminished leading to an increase of productivity. Additionally, there is no decline in sensitivity in high frequency regions due to low inductance thereby providing a high speed actuator. Because during manufacture, coils with a highly accurate coil thickness can be obtained, the control over the gap between the magnet and coil may be obtained fairly easily.

Figure 20:
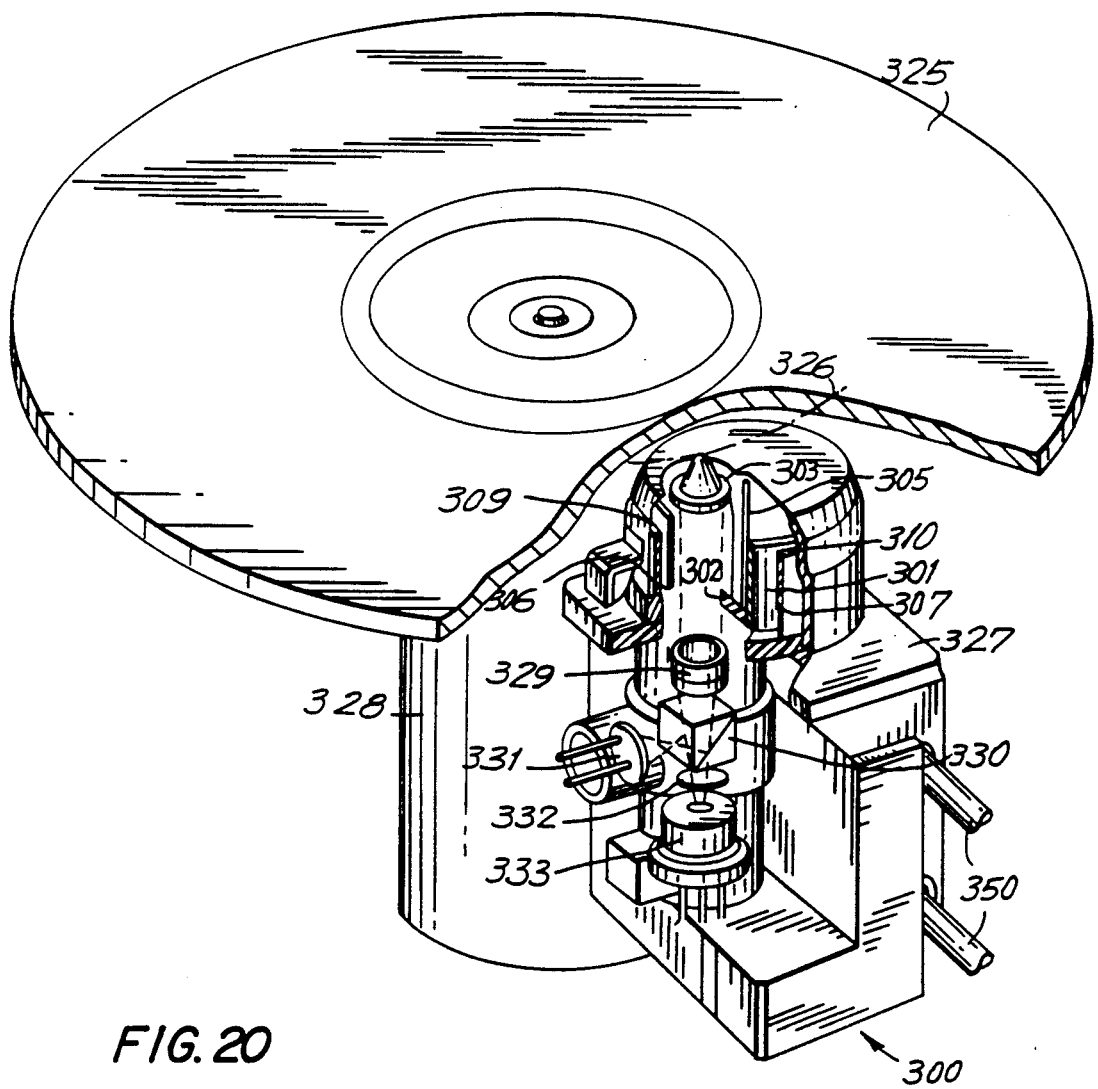
FIG. 20 is a sectional perspective view of an optical disk memory drive utilizing an optical head having an actuator constructed in accordance with the invention.

Reference is now made FIG. 20 wherein an optical head reader for a rewritable optical disk memory utilizing an actuator constructed in accordance with the present invention is provided. An optical head, generally indicated at 300, is supported on a base 327, which is supported on rods 350 to allow reciprocal motion of base 327. Optical head 300 includes a photo diode 331 for producing a light beam which passes through a beam splitter 330 and a one quarter wavelength plate 329. Light passes through one quarter wavelength plate 329 to an objective lens 303 to a "groove" 326 of a disk 325. To read the information contained on the disk light passes back through objective lens 303, one quarter wavelength plate 302 and beam splitter 330 where it is bent to project onto a semiconductor lens 333 supported on optical head 300.

Objective lens 303 is moved for focusing and tracking by an actuator as described above. A support shaft 5 mounted on base 327 supports a lens frame 302 rotatably thereabout. Objective lens 303 is mounted on lens frame 302. A cylindrical magnet 301 supports lens frame 302 so that magnet 301 and lens 303 are movable about and along the axis of shaft 305 in both an axial and rotational direction. Yokes 307 and 306 are mounted on base 327 and provided with coils 309 and 310 to cause movement of magnet 301 as described above.

In operation, head 300 moves in response to the movement of a motor. This movement along rods 350 provides coarse focusing and tracking of optical head 300 relating to the tracks found in disk 325. Fine focusing is effected by longitudinal movement of objective lens 303 along support shaft 305 while tracking is effected by rotating objective lens 303 about support shaft 305. In an exemplary embodiment optical head 300 is driven by a step motor, however, the optical head may be driven by an linear motor system making it possible for quick access to particular portions of disk 325.

Figure 21:
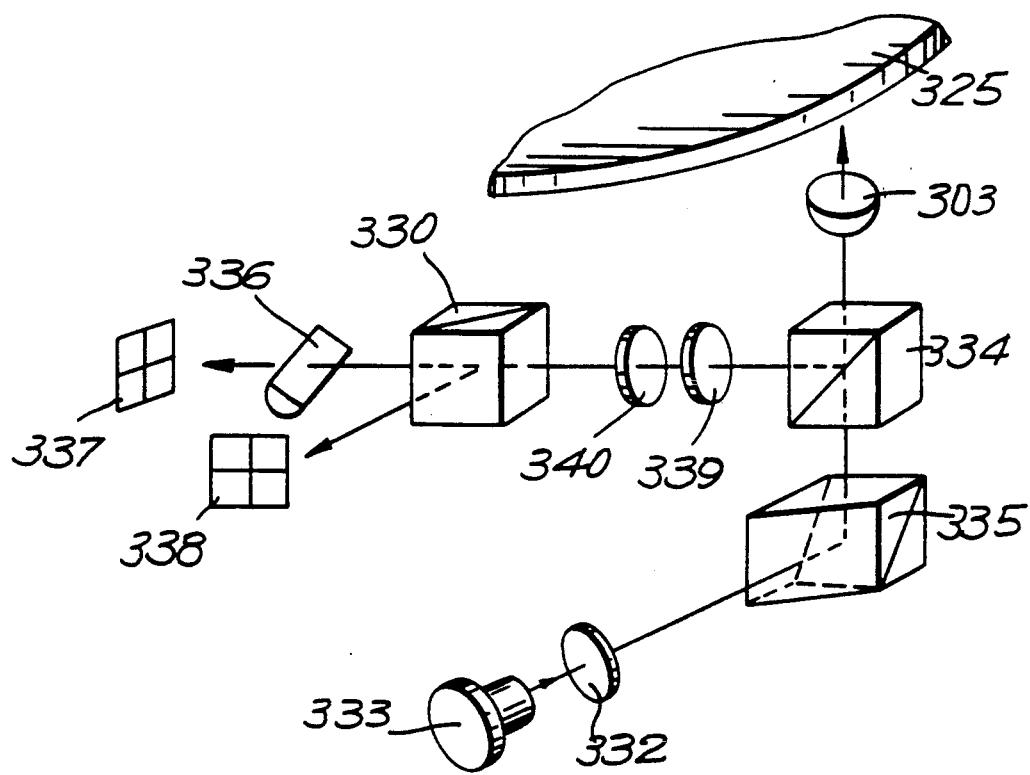
FIG. 21 is a block diagram depicting an optical head for use with a magneto-optic disk memory drive in accordance with the invention.

It is also possible to apply the actuator of the above invention to a magneto-optical rewritable optical disk as shown in FIG. 21. In such a configuration a semiconductor lens 333 provides a light beam which is passed through a lens 332, bent by prisms 335 and passed through a beam splitter 334 before reaching objective lens 303 which is supported within the actuator in a manner similar to lens 3 discussed above. This light then is projected on magneto-optical disk 325. The control of the amount lens 303 must move to be in focus is conducted by reflecting light back from disk 325 through objective lens 303 which is bent by beam splitter 334 and passed through a one half wavelength plate 339 and a lens 340. The light passing from lens 340 is then split by a beam splitter 330 and projected through a lens 336 onto a first focusing diode 337 and projected by beam splitter 330 onto a second focusing diode 338. The amount of light received by the focusing diodes 337, 338 is compared and a control signal is sent to the actuator for better focusing objective lens 330.

The actuator constructed in accordance with the present invention may be utilized as an objective lens actuator, whereby the actuator is applicable to a disc memory drive in a computer memory, optical disc file, CD, CD-ROM and LVD. Consequently, the performance of the device is increased while costs are reduced in each of these devices. Additionally, the actuator may also be applied to a precision positioning device such as in manufacturing a semiconductor intergrated circuit.

It will thus be seen that the objects set forth above among those made apparent from the preceding description, are efficiently attained and since certain changes may be made in carrying out the above method and in the constructions set forth without departing from the spirit and scope of the invention, it is intended that all matter contained in the above description or shown in the accompanying drawings shall be interpreted as illustrative and not in a limiting sense.

It is also to be understood that the following claims are intended to cove all of the generic and specific features of the invention herein described and all statements of the scope of the invention which as a matter of language might be said to fall therebetween.

What is claimed is:

1. An actuator supported on a shaft and movable rectilinearly in the axial direction of the shaft and rotatably about the shaft comprising:

a cylindrical magnet rotatably mounted about the shaft, the cylindrical magnet having a plurality of poles formed about said magnet in the radial direction, at least one of said poles having a magnetized boundary in a circumferential direction of the magnet and, at least one of said poles having a magnetized boundary in an axial direction of the magnet; and yoke means having a plurality of magnetic poles each in facing relationship with the magnetized boundaries of the cylindrical magnet, the yoke means including coil means for providing magnetic fields in said yoke means at said magnetic poles.

2. The actuator of claim 1, wherein said coil means are wound about regions of said yoke means out of facing relation to the circumferential surface of said cylindrical magnet.

3. An actuator supported on a shaft and movable rectilinearly in the axial direction of the shaft and rotatably about the shaft comprising:

a cylindrical magnet rotatably mounted about the shaft, the cylindrical magnet having a plurality of poles in the radial direction having magnetized boundaries in a circumferential direction of the magnet and an axial direction of the magnet;

the cylindrical magnet being a cylindrical ring having an outer circumference and an inner circumference, each magnetic pole of the yoke means being disposed in facing relationship with the inner circumference and the outer circumference of the cylindrical magnet; and yoke means having a plurality of magnetic poles each in facing relationship with the magnetized boundaries of the cylindrical magnet, the yoke means including coil means for providing magnetic fields in said yoke means at said magnetic poles.

4. The actuator of claim 2, wherein each magnetic pole of the yoke means is formed as a single body independent of the other magnetic poles.

5. The actuator of claim 1, wherein the cylindrical magnet is formed as a cylindrical ring having an inner circumference and outer circumference, the magnetic poles of the yoke means being in facing relationship with the outer circumference of the cylindrical magnet.

6. An actuator supported on a shaft and movable rectilinearly in the axial direction of the shaft and rotatably about the shaft comprising:

a cylindrical magnet rotatably mounted about the shaft, the cylindrical magnet having a plurality of poles in the radial direction having magnetized boundaries in a circumferential direction of the magnet and an axial direction of the magnet, the cylindrical magnet being formed as a cylindrical ring having an inner circumference and outer circumference, the magnetic poles of the yoke means being in facing relationship with the outer circumference of the cylindrical magnet; and yoke means having a plurality of magnetic poles each in facing relationship with the magnetized boundaries of the cylindrical magnet, the yoke means including coil means for providing magnetic fields in said yoke means at said magnetic poles; and a yoke ring affixed at the inner circumference of the cylindrical magnet.

7. The actuator of claim 1, further comprising a lens frame affixed within said cylindrical magnet, the lens frame having a bearing portion for being supported by the shaft.

8. An actuator supported on a shaft and movable rectilinearly in the axial direction of the shaft and rotatably about the shaft comprising:

a cylindrical magnet rotatably mounted about the shaft, the cylindrical magnet having a plurality of poles in the radial direction having magnetized boundaries in a circumferential direction of the magnet and an axial direction of the magnet;

yoke means having a plurality of magnetic poles each in facing relationship with the magnetized boundaries of the cylindrical magnet, the yoke means including coil means for providing magnetic fields in said yoke means at said magnetic poles;

a lens frame affixed within said cylindrical magnet, the lens frame having a bearing portion for being supported by the shaft; and a plastic sleeve disposed within said lens frame, the plastic sleeve receiving the shaft whereby the plastic sleeve acts as a bearing.

9. The actuator of claim 7, and including an objective lens supported in said lens frame for selectively positioning the lens by axial and rotational displacement of the magnet.

10. The actuator of claim 7, and including an objective lens supported on said cylindrical magnet for selectively positioning the lens by axial and rotational displacement of the magnet.

11. The actuator of claim 1, and including a laser light source, said lens being positioned for focusing and tracking adjustment of the light output of the laser light source.

12. An actuator as claimed in claim 1, and including an objective lens of an optical head supported on said cylindrical magnet for selectively positioning of the objective lens by its axial and rotational displacement of the magnet.

13. The actuator of claim 12, wherein the cylindrical magnet is formed as a cylindrical ring having an inner circumference and outer circumference the yoke means being in facing relationship with the outer circumference of the cylindrical magnet.

14. An actuator supported on a shaft and movable rectilinearly in the axial direction of the shaft and rotatably about the shaft comprising:

a cylindrical magnet rotatably mounted about the shaft, the cylindrical magnet having a plurality of poles in the radial direction having magnetized boundaries in a circumferential direction of the magnet and an axial direction of the magnet;

yoke means having a plurality of magnetic poles each in facing relationship with the magnetized boundaries of the cylindrical magnet, the yoke means including coil means for providing magnetic fields in said yoke means at said magnetic poles;

an objective lens of an optical head supported on said cylindrical magnet for selectively positioning of the objective lens by its axial and rotational displacement of the magnet; and a yoke ring affixed at the inner circumference of the cylindrical magnet.

15. An actuator supported on a shaft and movable rectilinearly in the axial direction of the shaft and rotatably about the shaft comprising:

a cylindrical magnet rotatably mounted about the shaft, the cylindrical magnet having a plurality of poles in the radial direction having magnetized boundaries in a circumferential direction of the magnet and an axial direction of the magnet;

yoke means having a plurality of magnetic poles each in facing relationship with the magnetized boundaries of the cylindrical magnet, the yoke means including coil means for providing magnetic fields in said yoke means at said magnetic poles; and at least one of said magnetized boundaries extends for a length substantially in a circumferential direction of the magnet and at least one boundary extends for a length substantially along the height of the magnet.

16. An actuator as claimed in claim 15, wherein said yoke means includes at least two yokes for controlling tracking of said magnet, said two yokes being positioned at opposed sides of said magnet to cooperate with said magnetized boundaries and at least two yokes for controlling focusing of said magnet being positioned on opposed sides of said magnet to cooperate with said magnetized boundaries.

17. An actuator supported on a shaft and movable rectilinearly in the axial direction of the shaft and rotatably about the shaft comprising:

a cylindrical magnet rotatably mounted about the shaft, the cylindrical magnet having a plurality of poles in the radial direction having magnetized boundaries in a circumferential direction of the magnet and an axial direction of the magnet; and yoke means having a plurality of magnetic poles each in facing relationship with the magnetized boundaries of the cylindrical magnetic, the yoke means including coil means for providing magnetic fields in said yoke means at said magnetic poles; said yoke means including at least one yoke, said yoke having channels formed therein and wire wrapped around said channels.

18. An actuator supported on a shaft and movable rectilinearly in the axial direction of the shaft and rotatably about the shaft comprising:
a cylindrical magnet rotatably mounted about the shaft, the cylindrical magnet having a plurality of poles in the radial direction having magnetized boundaries in a circumferential direction of the magnet and an axial direction of the magnet, the magnet being formed of $Sm(Co_{0.672}Cu_{0.08}Fe_{0.22}Zr_{0.028})_{8.35}$; and
yoke means having a plurality of magnetic poles each in facing relationship with the magnetized boundaries of the cylindrical magnet, the yoke means including coil means for providing magnetic fields in said yoke means at said magnetic poles.

19. An actuator supported on a shaft and movable rectilinearly in the axial discretion of the shaft and rotatably about the shaft comprising:
a cylindrical magnet rotatably mounted about the shaft, the cylindrical magnet having a plurality of poles in the radial direction having magnetized boundaries in a circumferential direction of the magnet and an axial direction of the magnet, the magnet being formed of $Sm_{0.5}Nd_{0.4}Ce_{0.1}(Co_{0.672}Cu_{0.08}Fe_{0.22}Zr_{0.028})_{8.35}$; and
yoke means having a plurality of magnetic poles each in facing relationship with the magnetized boundaries of the cylindrical magnet, the yoke means including coil means for providing magnetic fields in said yoke means at said magnetic poles.

20. The actuator of claim 1, wherein Pr is partially substituted for Sm.

21. An actuator supported on a shaft and movable rectilinearly in the axial direction of the shaft and rotatably about the shaft comprising:
a cylindrical magnet rotatably mounted about the shaft, the cylindrical magnet having a plurality of poles in the radial direction having magnetized boundaries in a circumferential direction of the magnet and an axial direction of the magnet, the magnet being at least partially formed of $Nd_{13}Fe_{82.7}B_{4.3}$; and
yoke means having a plurality of magnetic poles each in facing relationship with the magnetized boundaries of the cylindrical magnet, the yoke means including coil means for providing magnetic fields in said yoke means at said magnetic poles.

22. An actuator supported on a shaft and movable rectilinearly in the axial direction of the shaft and rotatably about the shaft comprising:
a cylindrical magnet rotatably mounted about the shaft, the cylindrical magnet having a plurality of poles in the radial direction having magnetized boundaries in a circumferential direction of the magnet and an axial direction of the magnet, the magnet being at least partially formed of $Zr_{2.5}(Ce_{0.2}Pr_{0.2}Nd_{0.6})_{12.5}Fe_{69}Co_9B_7$; and
yoke means having a plurality of magnetic poles each in facing relationship with the magnetized boundaries of the cylindrical magnet, the yoke means including coil means for providing magnetic fields in said yoke means at said magnetic poles.

23. An actuator supported on a shaft and movable rectilinearly in the axial direction of the shaft and rotatably about the shaft comprising:
a cylindrical magnet rotatably mounted about the shaft, the cylindrical magnet having a plurality of poles in the radial direction having magnetized boundaries in a circumferential direction of the magnet and an axial direction of the magnet, the magnet being at least partially formed of $Pr_{17}Fe_{76}Cu_2B_5$; and
yoke means having a plurality of magnetic poles each in facing relationship with the magnetized boundaries of the cylindrical magnet, the yoke means including coil means for providing magnetic fields in said yoke means at said magnetic poles.

24. An actuator supported on a shaft and movable rectilinearly in the axial direction of the shaft and rotatably about the shaft comprising:
a cylindrical magnet rotatably mounted about the shaft, the cylindrical magnet having a plurality of poles in the radial direction having magnetized boundaries in a circumferential direction of the magnet and an axial direction of the magnet, the magnet being at least partially formed of $Pr_{17}Fe_{75}Ga_2Al_1B_5$; and
yoke means having a plurality of magnetic poles each in facing relationship with the magnetized boundaries of the cylindrical magnet, the yoke means including coil means for providing magnetic fields in said yoke means at said magnetic poles.

* * * * *